(12) United States Patent
Zhou et al.

(10) Patent No.: US 8,590,873 B2
(45) Date of Patent: Nov. 26, 2013

(54) METHOD AND DEVICE FOR RESTRAINING MOVEMENT OF CONTINUOUSLY TRAVELING GLASS SHEET

(75) Inventors: Naiyue Zhou, Painted Post, NY (US); George Davis Treichler, Hammondsport, NY (US); Zepei Zhu, North York (CA)

(73) Assignee: Corning Incorporated, Corning, NY (US)

( * ) Notice: Subject to any disclaimer, the term of this patent is extended or adjusted under 35 U.S.C. 154(b) by 808 days.

(21) Appl. No.: 12/420,220

(22) Filed: Apr. 8, 2009

(65) Prior Publication Data

US 2010/0258993 A1 Oct. 14, 2010

(51) Int. Cl.
*B23Q 3/02* (2006.01)

(52) U.S. Cl.
USPC ................................ 269/20; 118/316; 65/114

(58) Field of Classification Search
USPC ............. 269/20, 6, 3, 71, 32, 250 CS, 289 R; 65/253, 256–257
See application file for complete search history.

(56) References Cited

U.S. PATENT DOCUMENTS

| | | | | |
|---|---|---|---|---|
| 1,430,226 A * | 9/1922 | Evarist | ............... | 269/27 |
| 1,578,926 A * | 3/1926 | Shields | ............... | 65/98 |
| 1,755,365 A * | 4/1930 | Rowley | ............... | 33/32.4 |
| 3,967,723 A * | 7/1976 | Beckham | ............... | 198/403 |
| 4,006,002 A * | 2/1977 | Hetman, Jr. | ............... | 65/114 |
| 4,326,571 A * | 4/1982 | Crawford | ............... | 144/34.5 |
| 4,488,846 A * | 12/1984 | Halberschmidt et al. | ...... | 414/152 |
| 4,525,195 A * | 6/1985 | Foster | ............... | 65/260 |
| 4,902,213 A * | 2/1990 | Lisec | ............... | 425/113 |
| 6,000,686 A * | 12/1999 | Yates | ............... | 269/6 |
| 6,368,408 B1 * | 4/2002 | Schuler | ............... | 118/316 |
| 7,430,880 B2 * | 10/2008 | Butts et al. | ............... | 65/253 |
| 2007/0039990 A1 | 2/2007 | Kemmerer et al. | | |
| 2007/0116913 A1 | 5/2007 | Kimura et al. | | |
| 2008/0092594 A1* | 4/2008 | Vianello et al. | ............... | 65/61 |
| 2008/0276646 A1 | 11/2008 | Chalk et al. | | |
| 2008/0276785 A1* | 11/2008 | Dahroug et al. | ............... | 83/886 |

FOREIGN PATENT DOCUMENTS

| | | |
|---|---|---|
| CN | 1966436 A | 5/2008 |
| JP | 05-124827 A | 5/1993 |
| JP | 2008-094692 A | 4/2008 |

* cited by examiner

*Primary Examiner* — Monica Carter
*Assistant Examiner* — Melanie Alexander
(74) *Attorney, Agent, or Firm* — Kevin M. Able (57) ABSTRACT

A sheet restrainer is used to restrain movement of continuously traveling glass sheet and includes arms on either side of the glass sheet. A driving device coupled to the arms moves the arms from a retracted position in which the arms are withdrawn from the glass sheet to an engaged position in which the arms are near the glass sheet and in alignment with each other. Rollers are connected to the arms and contact the glass sheet in the engaged position. A damping device applies an adjustable damping force to at least one of the arms dampening movement of the arm in the engaged position thereby restraining movement of the sheet. In a method of operation, the damping devices restrain angular and/or lateral movement of the sheet by transmitting movement of the sheet against the rollers into a resistive damping force of the damping devices.

16 Claims, 10 Drawing Sheets

METHOD AND DEVICE FOR RESTRAINING MOVEMENT OF CONTINUOUSLY TRAVELING GLASS SHEET

TECHNICAL FIELD

The field is restraining movement of continuously traveling glass sheet during scoring and separation of the sheet.

TECHNICAL BACKGROUND

A fusion process (e.g., downdraw process) forms high quality thin glass sheets that can be used in a variety of devices such as flat panel displays. Glass sheets produced in a fusion process have surfaces with superior flatness and smoothness when compared to glass sheets produced by other methods. The fusion process is described below with respect to FIG. 1 (Prior Art) but for a more detailed description refer to co-assigned U.S. Pat. Nos. 3,338,696 and 3,682,609, which are incorporated herein by reference in their entireties.

Figure 1:
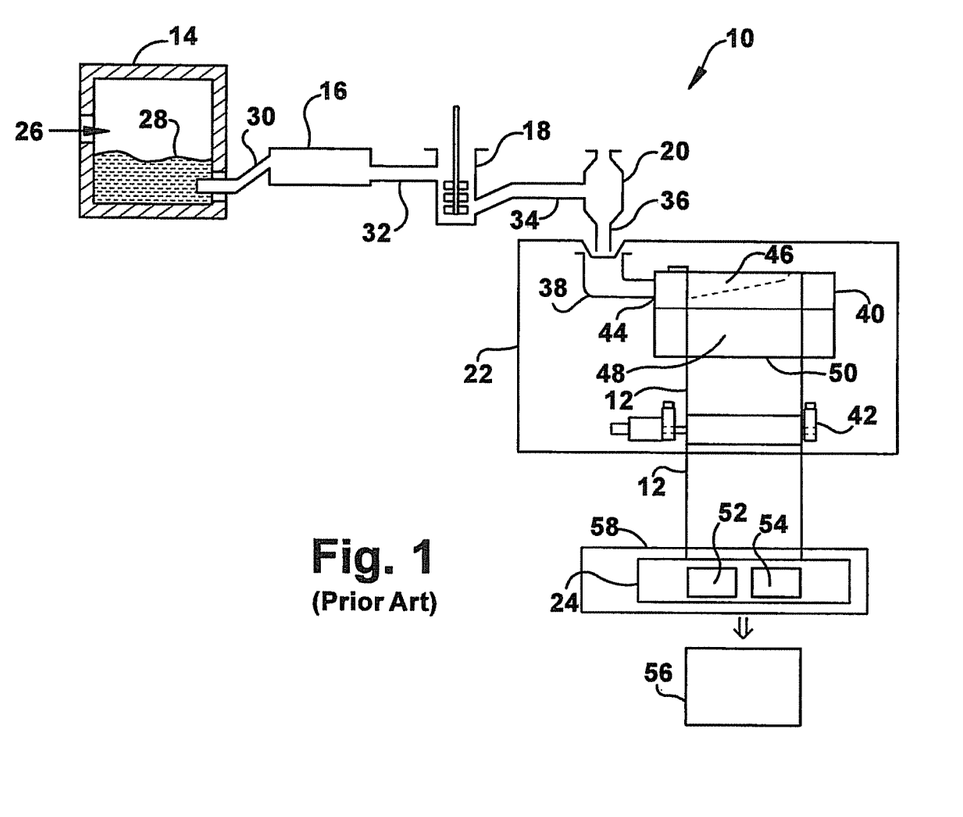
FIG. 1 (Prior Art) is a schematic view of a prior art apparatus including a fusion draw machine.
Figure 2:
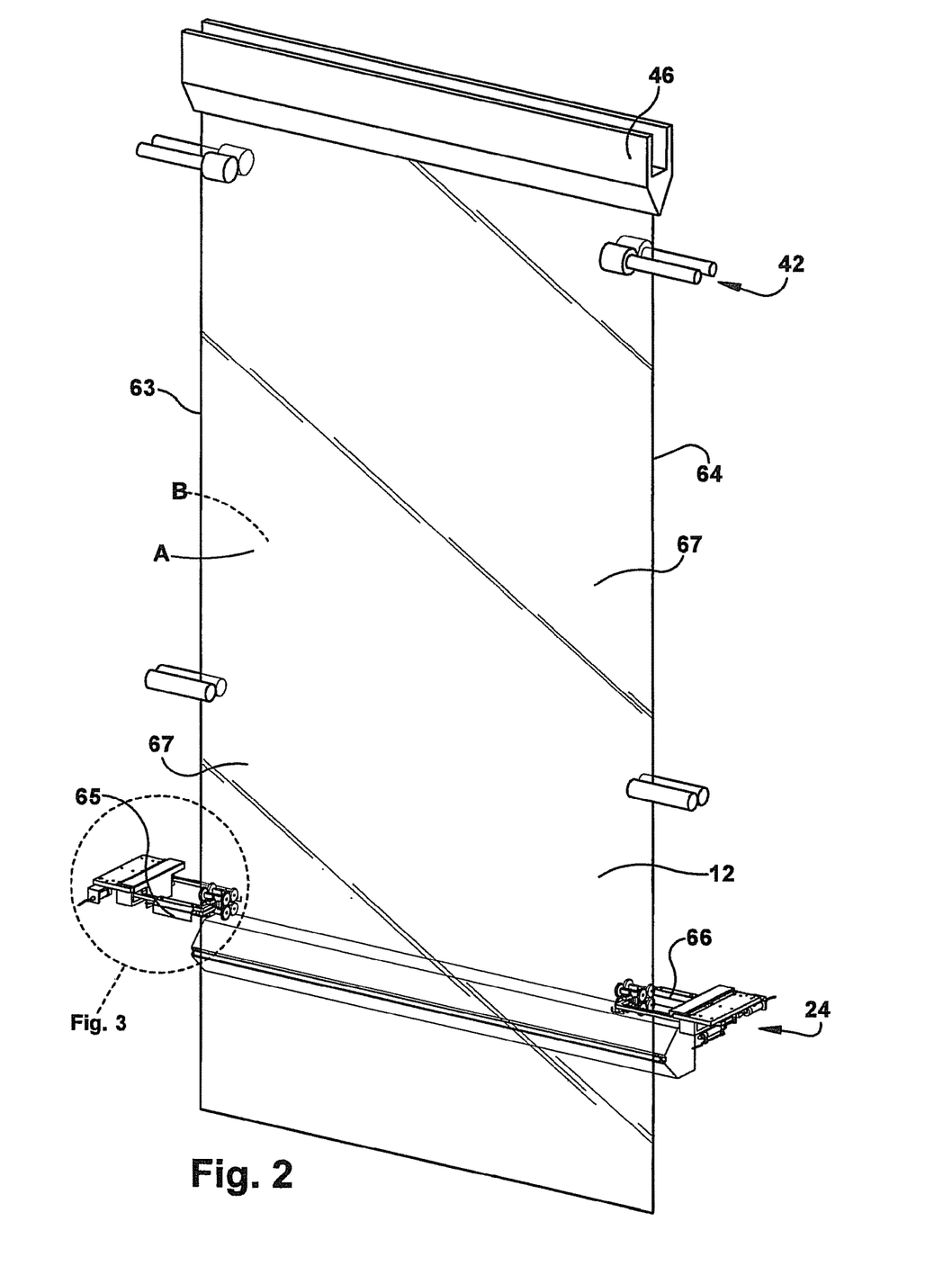
FIG. 2 is a side view showing a first embodiment of a pivotable sheet restraining device in position on a glass sheet mounted to a TAM.

FIG. 1 shows a schematic view of an exemplary glass manufacturing system 10 which utilizes the fusion process to make a glass sheet 12. As shown, the exemplary glass manufacturing system includes melting vessel 14, fining vessel 16, mixing vessel 18, delivery vessel 20, fusion draw machine (FDM) 22, and traveling anvil machine (TAM) 24. Typically, components 16, 18 and 20 are made from platinum or platinum-containing metals, but they may also comprise other temperature resistant metals.

Melting vessel 14 is where the glass batch materials are introduced as shown by arrow 26 and melted to form molten glass 28. Melting vessel 14 is connected to fining vessel 16 by melting to fining vessel connecting tube 30. Fining vessel 16 has a high temperature processing area that receives molten glass 28 (not shown at this point) from melting vessel 14 and in which bubbles are removed from molten glass 28. Fining vessel 16 is connected to mixing vessel 18 by a finer to stir chamber connecting tube 32. Mixing vessel 18 is connected to delivery vessel 20 by a stir chamber to bowl connecting tube 34. Delivery vessel 20 delivers molten glass 28 through a downcomer 36 into FDM 22 which includes inlet 38, forming vessel 40 (e.g., isopipe), and pull roll assembly 42.

As shown, molten glass 28 flows from downcomer 36 into inlet 38 which leads to forming vessel 40 which is typically made from a ceramic or a glass-ceramic refractory material. Forming vessel 40 includes opening 44 that receives molten glass 28 which flows into trough 46 and then overflows and runs down two lengthwise sides 48 (only one side shown) before fusing together at what is known as root 50. Root 50 is where the two lengthwise sides 48 come together and where the two overflow walls of molten glass 28 rejoin (e.g., refuse) to form glass sheet 12 that is then drawn downward by pull roll assembly 42. The glass sheet cools as it is drawn, transitioning from a molten state at the root, to a visco-elastic state and finally to an elastic state. Pull roll assembly 42 delivers drawn glass sheet 12 which, at the bottom of the isopipe is substantially flat, but which later in the process may develop a slightly bowed or curved shape across the width and/or length of the glass sheet 12. This bowed shape may remain in glass sheet 12 all the way to TAM 24. Continuous beads are formed along the outer periphery of first and second sides 63, 64 of the glass due to the pull rollers contacting the glass. A quality region of the glass is the major surfaces of the glass between the beads, whereas non-quality regions are the regions from the beads to the outer edges at the first and second sides 63, 64 of the sheet.

TAM 24 comprises a laser-mechanical scoring device (or a mechanical scoring device) 52 and nosing device 54 that are used to score the drawn glass sheet, while the TAM moves vertically at the same rate as the glass sheet, so it can then be separated into distinct pieces of glass sheets 56. TAM 24 is located in the elastic region of the sheet in an area referred to herein as a bottom of the draw 58. TAM 24 operates in cycles, the cycle beginning at the first side 63 of the glass at a location that is above the location where the glass will be bent and separated. An optical head and quenching nozzle assembly mounted to the TAM move along the score line from first side 63 toward second side 64 of the glass, while the glass and the TAM continue to travel vertically downward at the same rate. The TAM then reaches the end of its stroke at second side 64 once the laser scoring and quenching processes are completed. The glass bending is carried out along the score line and the robotic equipment located near but below the score line at this point of downward travel of the sheet, separates an individual glass sheet from the continuous sheet. The TAM moves upward, returning to the beginning of the stroke at first side 63 of the glass.

Nosing, pressing, ironing caused by scoring and separating processes cause motion in the glass sheet which in turn contributes to the creation of stress variation within the glass sheet. Sheet motion at the bottom of the draw is mainly driven by sheet scoring and separation processes. Depending on the bottom of the draw setup, robot tooling can also introduce sheet motion. Post separation sheet dangling can be another source of sheet motion if nosing retraction is not controlled properly. On the other hand, over constraint of the sheet by fixed rollers can cause sheet breakage and sheet crackout during the scoring process. Sheet motion produced by any of the above mechanisms, or any other mechanism, can propagate upward into the visco-elastic region of the glass sheet, and becomes especially troublesome in the region where the sheet transitions from a visco-elastic state to an elastic state. Here, stresses caused by movement of the sheet can be frozen into the sheet, and manifest later as, for example, shape changes when the sheet is separated or otherwise further processed.

SUMMARY

We have developed a pair of sheet restraining units on each of the first and second sides of the sheet, which can be installed above the score line. The sheet restraining unit functions in such a way that it restrains the sheet but complies with the sheet shape, i.e., having a clamping force sufficient to hold the sheet without forcing sheet shape change. It will not block sheet vertical motion and will allow the sheet to move in a horizontal plane. It will absorb the kinematic energy from the sheet while moving with the sheet and effectively dampen the sheet motion during separation and post separation. It will also help to simulate the off-line manual separation process by restraining the sheet above the score line to provide a much more symmetrical bending separation setup. It can either be engaged throughout the TAM cycle or during partial processes such as scoring and separation, and will contact the sheet in the non-quality region and close to the beads. The device can also help with the reliable separation of large size sheet (e.g., generation 8 and above) with an improved bending separation condition. In addition, it provides a tool for laser scoring bending separation process optimization for less sheet motion and better edge quality.

The sheet restrainer will be used as a bottom of the draw sheet motion reduction tool, especially during separation and post separation periods. The sheet restraining device is installed above the score line and can engage the sheet throughout the TAM cycle, during partial processes such as scoring and separation, or it can constantly engage the sheet when it is mounted to a fixed frame. The device will contact the sheet in the non-quality areas close to the beads. It will allow for free sheet travelling in the vertical direction and free sheet motion in the horizontal plane with no change to sheet shape. It is designed to absorb the kinematic energy from the sheet while moving with the sheet in the horizontal plane and damping the sheet motion during engagement. The coefficient of damping is adjustable based on the process needs.

A first embodiment is a sheet restrainer for restraining movement of a continuously traveling glass sheet, comprising arms on either side of the glass sheet. A driving device (such as a pneumatic or hydraulic cylinder) is coupled to the arms and moves them from a retracted position in which the arms are withdrawn from the glass sheet to an engaged position in which the arms are near the glass sheet and in alignment with each other. Rollers are connected to the arms and contact the glass sheet in the engaged position. Reference to alignment of the arms of a unit does not mean perfect alignment but means that the rollers are on either side of the glass sufficient to impart a clamping force to the glass between them. A damping device applies an adjustable damping force to at least one of the arms dampening movement of the arm in the engaged position thereby restraining movement of the sheet.

Referring to details of the sheet restrainer, the damping device can include a piston movable within a pneumatic or hydraulic cylinder that provides the damping force. Alternatively, the damping device can include magnets that provide eddy currents as the damping force.

A pivotable variation of the sheet restrainer includes a frame. The arms are pivotally mounted to the frame. The driving device includes a hydraulic or pneumatic cylinder connected to one of the arms and a piston rod connected to the other of the arms extending from a piston movable in the cylinder. Extension or retraction of the piston and piston rod causes the arms to pivot between the retracted and engaged positions. The arms each comprise a first arm portion that is pivotally mounted to the frame and a second arm portion that is pivotally mounted to the first arm portion. The rollers are carried on the second arm portion. The damping device includes a first dashpot connected to the frame and the first arm portion of one of the arms dampening movement of the arms due to lateral movement of the sheet, and a second dashpot connected to the first and second arm portions of one of the arms dampening pivotable movement of the second arm portion relative to the first arm portion due to angular movement of the sheet.

A linearly movable variation of the sheet restrainer includes a frame. A carriage is mounted to the frame in which each of the arms can slide in a linear direction. The driving device includes a pneumatic or hydraulic cylinder mounted to the frame and connected to each of the arms causing the arms to move linearly between the retracted position and the engaged position in the carriage. The cylinder also functions as the dampening device, dampening linear movement of the arms due to lateral movement of the sheet.

In the pivotable and linear sheet restrainers the frame may be part of a traveling anvil machine that travels at a rate of the glass sheet, or it may be fixed relative to movement of the glass sheet.

A second embodiment of the invention features a method of restraining movement of the continuously traveling glass sheet. A continuously traveling vertically oriented glass sheet is provided. The sheet comprises a visco-elastic region and an elastic region. Also provided is the sheet restrainer. The method includes moving the arms in a seeking phase until the rollers contact the sheet in the engaged position and the arms are in alignment with each other. The glass can be clamped at this point from rollers on both sides of the sheet and at both ends of the sheet. Next, an adjustable damping force is applied to the arm in response to movement of the sheet restraining the sheet movement in a sheet restraining phase.

Referring to details of the method, in the case of the pivotable sheet restrainer, applying a dampening force comprises providing a first dashpot connected to the frame and a first arm portion of one of arms, the first arm portion being pivotably connected to the frame, and providing a second dashpot connected to the first arm portion and the second arm portion of one of the arms, the second arm portion being pivotably connected to the first arm portion. Pivotable movement of the first arm portion is dampened when lateral movement of the sheet causes at least one of the arms to move against a force of the first dashpot. Pivotable movement of the second arm portion is dampened when angular movement of the sheet causes the second arm portion to move against a force of the second dashpot. In the case of the linearly movable sheet restrainer, moving the arms comprises driving a hydraulic or pneumatic cylinder causing the arms to move linearly between the retracted and engaged positions in the carriage. Applying a damping force comprises damping movement of the arms when lateral movement of the sheet causes the arms to move against the force of the cylinder.

Regarding further details of the method, the sheet restrainer clamps the sheet in the seeking phase and throughout the sheet restraining phase without changing a shape of the sheet. The sheet restraining phase takes place at least during scoring and separation of the sheet. The sheet restrainer is ideally suited for processes that use laser scoring because this reduces sheet movement during separation. The sheet is clamped near where laser scoring of the sheet is conducted resulting in more symmetrical bending of the sheet. The clamping of the sheet results in less sheet motion transferred to the sheet at a fusion draw machine above the sheet restrainer which reduces stress in the sheet. The clamping of the sheet is conducted at a force that is not conducive to sheet breakage and sheet crackout.

The following advantages are provided by the sheet restrainer. The sheet is restrained but complies with sheet shape which is a major difference from existing edge guides/ rollers at the bottom of the draw and offers benefits to forming process stability. Sheet motion is dampened by absorbing the kinematic energy from the sheet while moving with the sheet. A better bending separation setup is established for both large size (generation 8 and above) and laser scoring processes. A generic tool is provided to control or restrain the sheet without introducing excessive stress (binding) or changing sheet shape. It helps to avoid crackout during mechanical scoring. A low cost approach is provided to minimize bottom of the draw sheet motion during separation and post separation.

Many additional features, advantages and a fuller understanding of the invention will be had from the accompanying drawings and the detailed description that follows. It should be understood that the above Technical Summary provides a description in broad terms while the following Detailed Description provides a more narrow description and presents embodiments that should not be construed as necessary limitations of the broad invention as defined in the claims.

DETAILED DESCRIPTION

The sheet restrainers shown in the embodiment of FIGS. 2-5 are attached to TAM carriage 24 located above score line 62. The sheet restrainers are individual units, one on first side 63 of the glass sheet and the other on second side 64 of the sheet. Two sheet restrainer units 65, 66 are needed to restrain the sheet from both sides A, B (bead areas 67) once the sheet is clamped by each unit. Each unit includes two swing arms 68 movable about pivots 70 connected to frame 72 mounted to the TAM. Each swing arm 68 includes a main arm or first arm portion 74 and an angular control arm or second arm portion 76. Main arm 74 moves about pivot 70 and has an end 78 proximal to the sheet and an end 80 distal to the sheet. Angular control arms 76 are pivotally mounted at pivots 77 to proximal end 78 of each main arm 74. Each unit (e.g., unit 65, FIG. 3) includes a set of four rollers (a pair of rollers 82, and a pair of rollers 84) in contact with\glass sheet 12 on each side (A, B) of the sheet, which allow the sheet to move vertically with respect to the restrainer without constraint. Although four rollers are shown, a different number of rollers may be employed, for example, two rollers on each side of each unit. All rollers in this disclosure can have compliant surfaces such as heat resistant rubber or other polymer. The rollers are mounted on axles 86 that rotate in bearings 88 in an H-shaped frame 90 connected to angular control arm 76 so that the rollers can conform to the sheet surface. The angular control arm transmits angular motion of the glass sheet shown by the arrows 92 (FIG. 4) to an angular control dashpot unit 94, which controls and dampens the angular movement of the angular control arm. Dashpot unit 94 may be, for example, a pneumatic or hydraulic dashpot. Cylinder 96 of the angular control dashpot unit is fixed to main arm 74 while a free end of piston rod 98 of the dashpot is mounted at pivot point 100 on the angular control arm. A pivot point, such as pivot point 100, may comprise, for example, a bolt, a cotter pin, a wrist pin, or any other suitable fastener that allows pivoting of piston rod 98 about the pivot point. Digital pressure regulator 102 is used to control the coefficient of damping of angular control dashpot 94. Although only a single pressure regulator is shown controlling the cylinder and two dashpots for clarity, multiple pressure regulators could be used. For example, one pressure regulator can be devoted to each cylinder (e.g. three).

Figure 3:
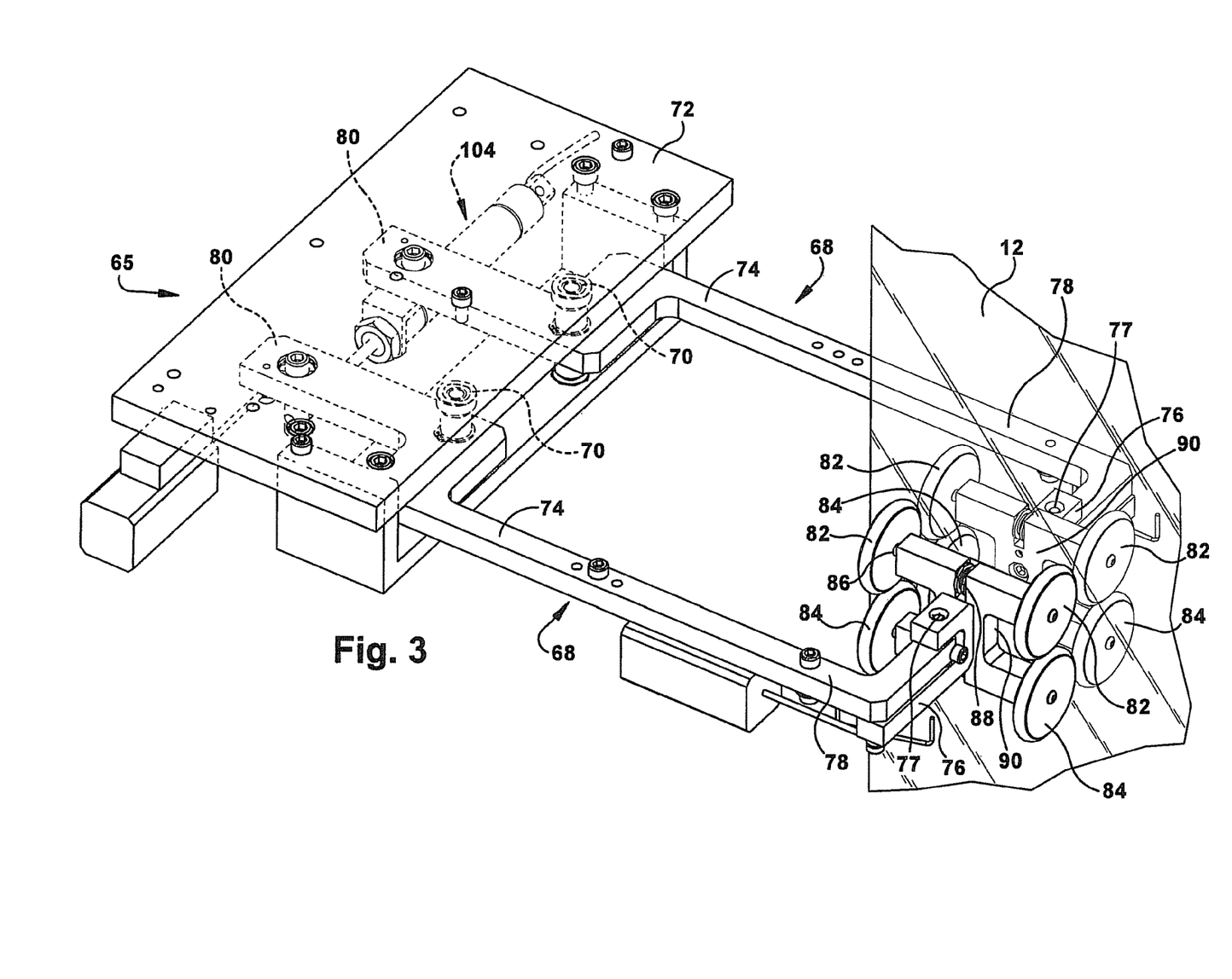
FIG. 3 is a perspective view identified by dotted lines in FIG. 2.
Figure 4:
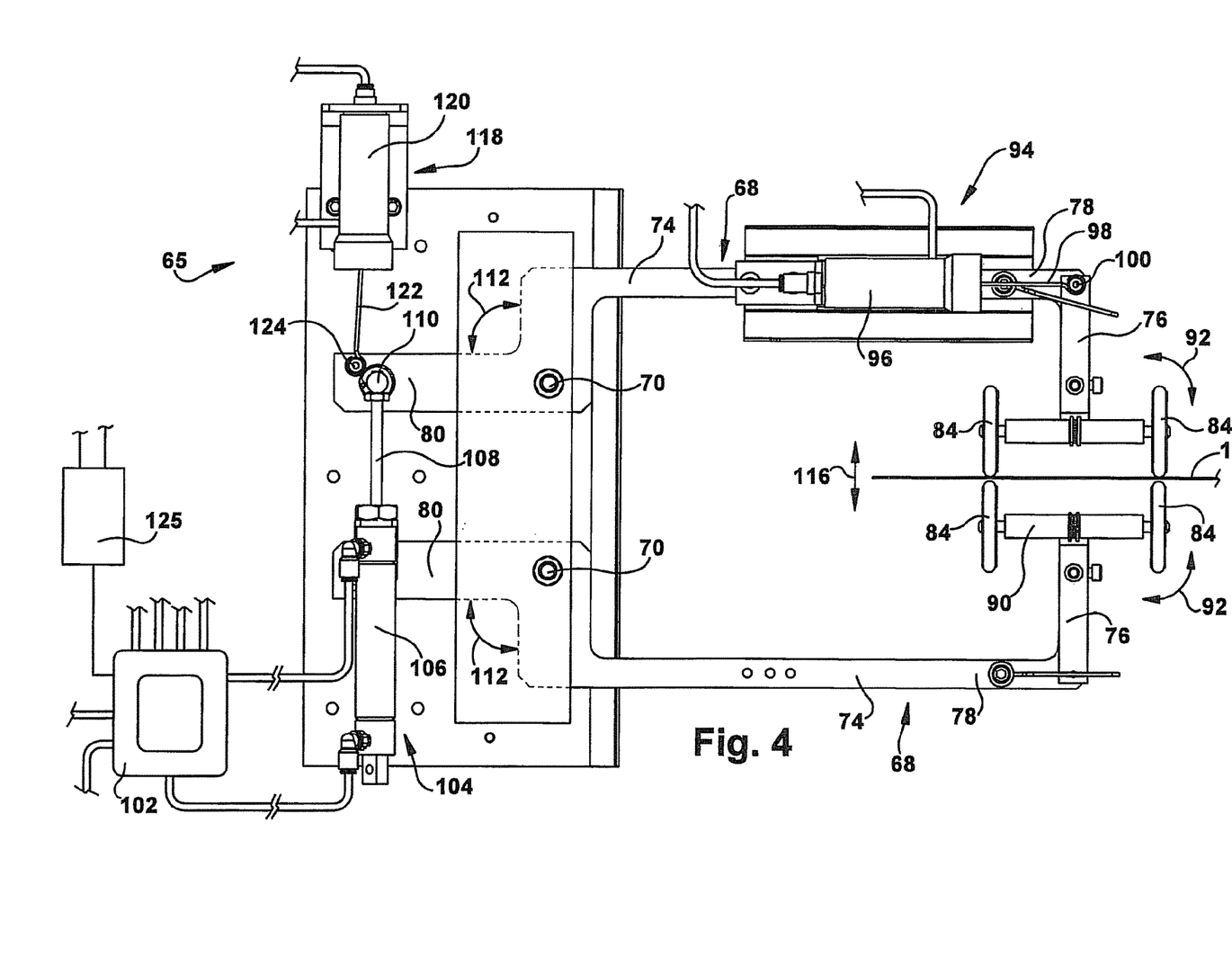
FIG. 4 is a bottom plan view of the device of FIG. 3.

Swing arms 68 are used in a seeking phase to contact and clamp the glass. Hydraulic or pneumatic clamping air cylinder unit 104 is used to open and close swing arms 68 for engagement (clamping) and disengagement (unclamping) with the sheet. Cylinder 106 is fastened to distal end 80 of one of the swing arms while a free end of piston rod 108 extending from the piston of the cylinder is pivotably fastened to the distal end of another of the swing arms using fastener 110. Fastener 110 provides a pivot point for piston rod 108. The extension and retraction of the piston and piston rod in the cylinder enables the swing arms to function like scissors, wherein each swing arm 68 pivots about pivot point 70, shown by arrows 112, causing rollers 82, 84 to alternately clamp onto and release the glass sheet. Air cylinder 104 also controls the pressure of the rollers on the glass (how tight the glass sheet is clamped). Digital pressure regulator 102 is used to control the clamping force of the rollers on the glass by regulating the pressure output from pressure regulator 102 and hence the force applied by cylinder 106.

Figure 5:
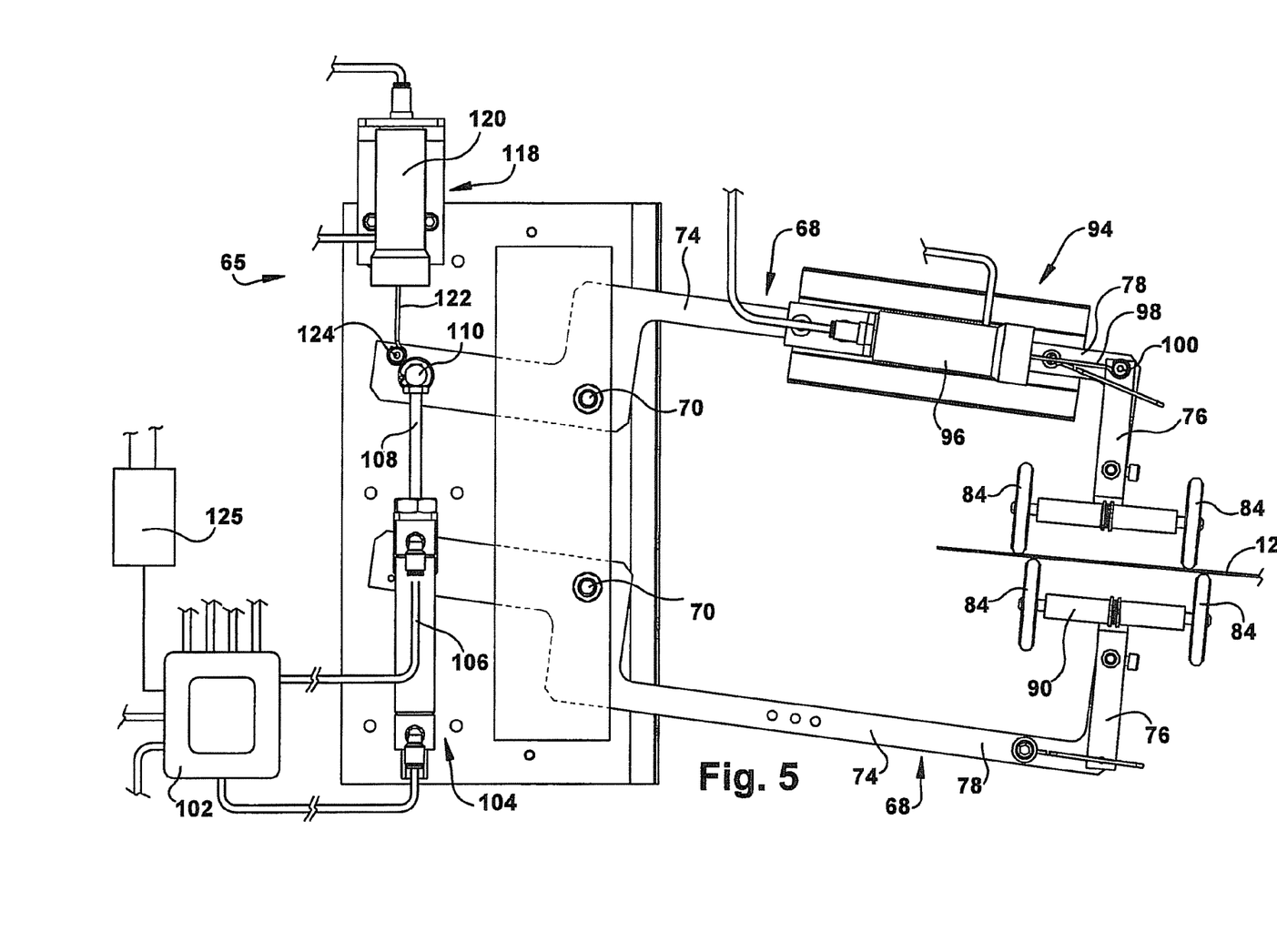
FIG. 5 is a bottom plan view of the device showing lateral and angular movement of the glass sheet being restrained by lateral and angular control dashpots of the device.

Once the glass sheet is clamped, swing arms 68 accommodate the sheet lateral motion (in the horizontal plane shown by arrows 116) and transmit lateral movement of the glass sheet to lateral control dashpot unit 118 mounted to frame 72. Hydraulic or pneumatic cylinder 120 of lateral control dashpot unit 118 is mounted to the frame while a free end of piston rod 122 extending from the piston of the lateral control dashpot unit is pivotably connected to fastener 124 attached to a distal end 80 of a main arm 74 of one of the swing arms. Fastener 124 provides a pivot point for piston rod 122. The lateral control dashpot unit 118 controls and dampens movement of swing arms 68 resulting from lateral movement 116 of the glass sheet. Pivotable movement 112 of the swing arms while in a clamped position moves piston rod 122 into and from cylinder 120. Digital pressure regulator 102 is used to control the lateral control dashpot's coefficient of damping so that lateral movement of the clamped sheet is damped.

The pneumatic or hydraulic cylinders for the swing arms, lateral control dashpot and angular control dashpot function to apply a constant predetermined pressure against their respective pivot points; and their clamping pressure or damping coefficients are adjusted by digital pressure regulator 102. Digital pressure regulator 102 may be, for example, a Series ITV digital pressure regulator by SMC Corp. An example of a suitable type of dashpot is Airpot Corp. Product No. 2KS160P2.0NY. The timing for applying the seeking pressure and clamping force and magnitude of the seeking pressure and clamping force applied by the swing arm cylinder, and the damping coefficients of the angular and lateral control dashpot units, are controlled by programmable logic controller (PLC) 125.

The process sequence for operating sheet restraining units 65, 66 is as follows (refer to FIGS. 3 and 4), which will be described only with respect to unit 65, it being understood that sheet restrainer unit 66 is operated the same way. Prior to engagement of the rollers with the glass sheet, the PLC instructs via pressure regulator 102 the clamping air cylinder 104 to retract to open swing arms 68 so that they are out of the way of the glass sheet. At this stage, the PLC sets the pressure regulators controlling the dashpot units such that the dashpots move freely (minimal damping). To engage the rollers of the sheet restrainer unit with the glass, the PLC instructs the piston and piston rod 108 of clamping air cylinder 104 to extend, causing swing arms 68 to pivot about their respective pivot points 70, which closes the swing arms at ends 78 and moves rollers 82, 84 into contact with the glass sheet (in the engaged position, FIG. 3). Pressure regulator 102 is adjusted via PLC 125 to control the pressure of the rollers on the glass sheet. A flow control regulator attached to the air cylinder is controlled by the PLC or manually set at one setting to control the closing speed of the arms.

As swing arms 68 and rollers 82, 84 close on the glass sheet, they move to the position of the sheet and then stop because of the low driving force (pressure) and slow engagement speed. A position sensor (not shown) may also be used to signal to the PLC when the arms have contacted the glass via the rollers, which can provide information to the PLC instructing it to stop the extension of the clamping cylinder piston rod. After the rollers reach a final engagement position against the glass sheet, the PLC resets pressure regulator 102 controlling the dashpot units to higher pressure so that the dashpot units effectively dampen the lateral and angular movements of the glass sheet. Therefore, the sheet restrainer units act as flexible holding devices to restrict motion of the sheet resulting from the separating of the glass sheet below the score line, and as sheet motion dampeners to dampen high frequency sheet movements after separation by absorbing energy from sheet motion.

The sheet restrainer units may be attached to TAM 24 where they either constantly engage the sheet even during the return upward stroke of the TAM, or they can retract during the upward stroke and then reengage the glass at the start of the next downward stroke. The sheet restrainer units will contact the glass sheet at least during scoring and separation processes. The sheet restrainer units can also be operated to constantly engage the glass while mounted to a fixed frame.

Figure 6:
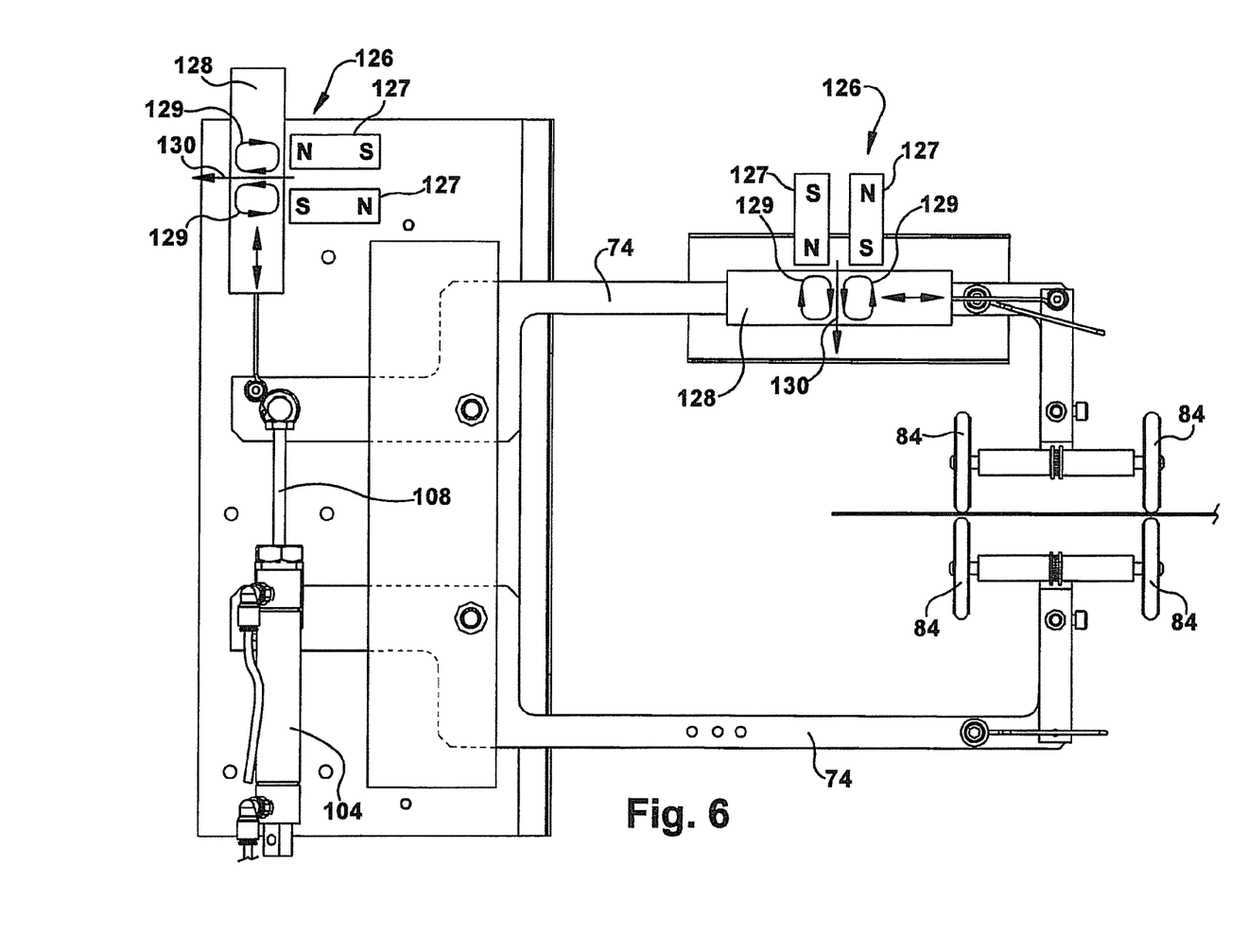
FIG. 6 is a bottom plan view of a device of the first embodiment using magnetic dampening devices.
Figure 7:
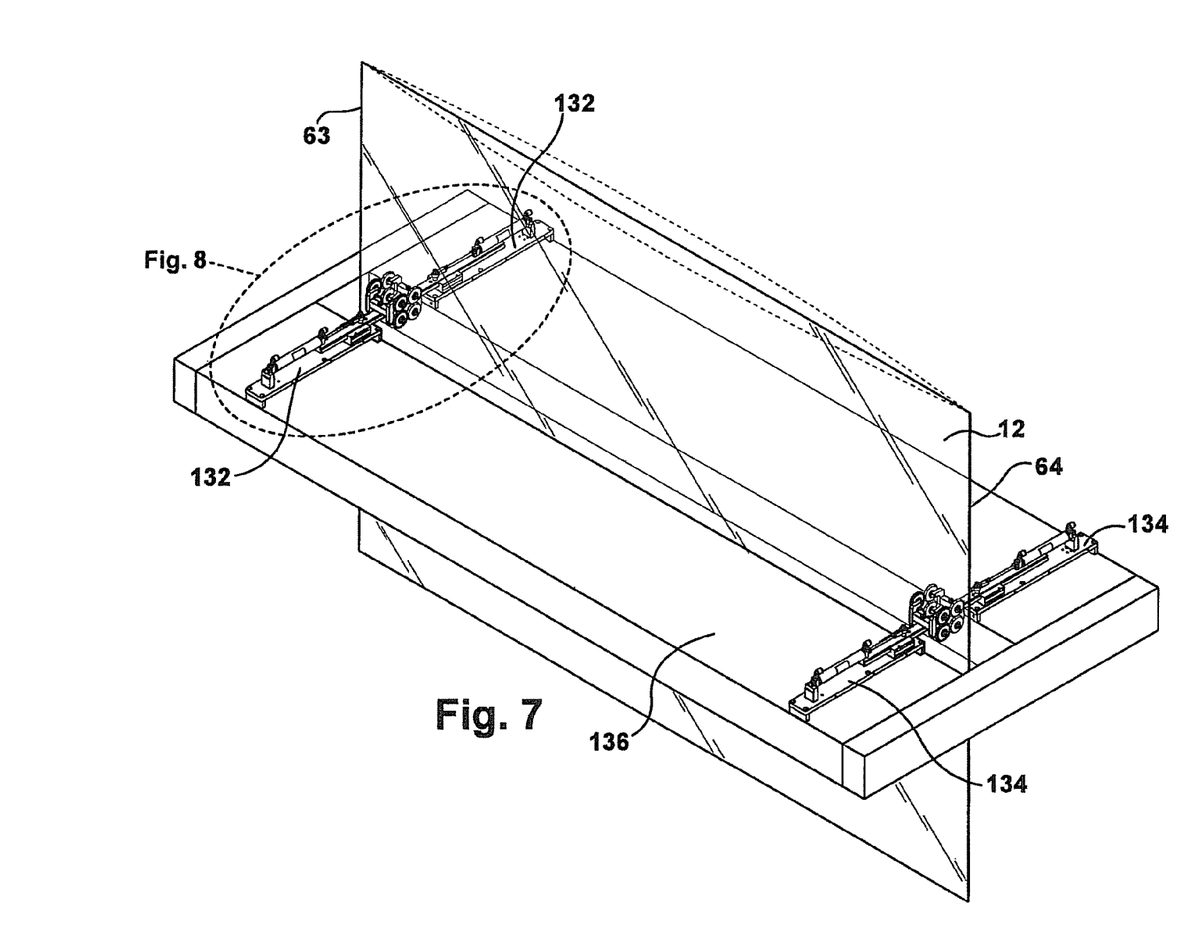
FIG. 7 is a perspective view showing a second embodiment of a linear sheet restraining device in position on a glass sheet mounted to a fixed frame.

Referring to FIG. 6, another embodiment uses magnetic damping "dashpots units" 126 instead of air or oil dashpot units 94 or 118. Each dashpot includes magnets 127 supported near a movable metal arm 128. The magnets generate eddy currents in the arm 128, which generates electric field 130. This dampens movement of arms 128 in either direction shown by the double-headed arrow on the arm.

Referring to the embodiment of FIGS. 7-12, linear sheet restrainers are shown. The linear sheet restrainers are individual units, one unit 132 or pair of devices at first side 63 of the glass and another unit 134 or pair of devices at second side 64 of the glass. The operation of only one linear sheet restrainer unit 132 will be discussed for the sake of clarity, it being understood that the other unit 134 operates the same way. Fixed frame 136 is located a predetermined distance above the score line. Arms 138 are each adapted to be moved linearly in carriage 140 mounted to the frame. Pneumatic or hydraulic cylinder unit 142 is mounted to the frame, and performs both a clamping and a dampening function. Piston rod 144 extending from a piston in cylinder 143 is connected to arm 138 at its free end. Movement of piston rod 144 out of or into cylinder 143 moves arm 138 inside carriage 140 alternately away from or towards the cylinder. An example of a suitable low friction, damping air cylinder unit is an Airpot Corp. AIRPEL™ type of cylinder, Product No. E16D20U. The cylinder unit 142 is controlled by pressure regulator 146, which receives electronic signals from PLC 148.

Figure 8:
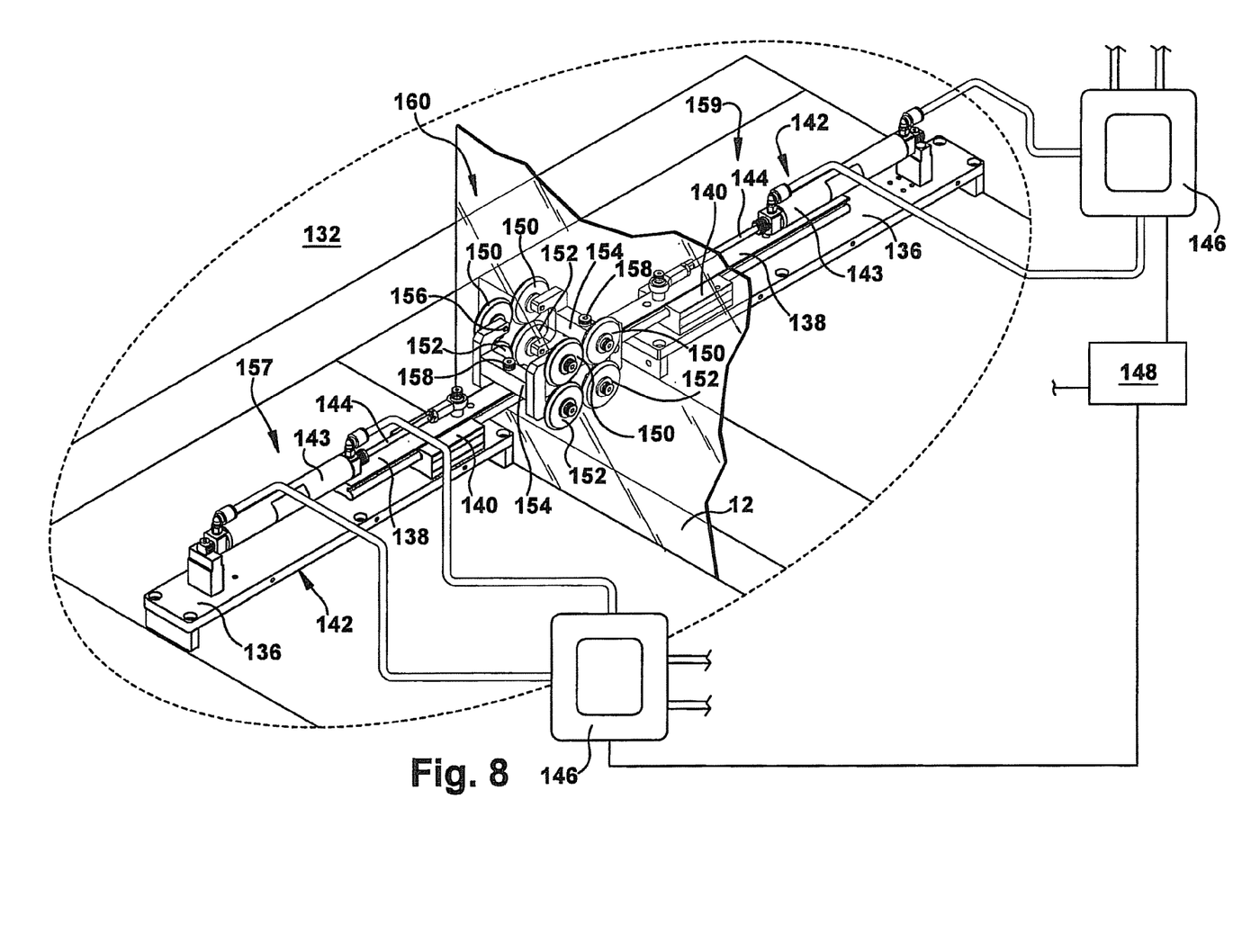
FIG. 8 is a perspective view identified by dotted lines in FIG. 7.
Figure 9:
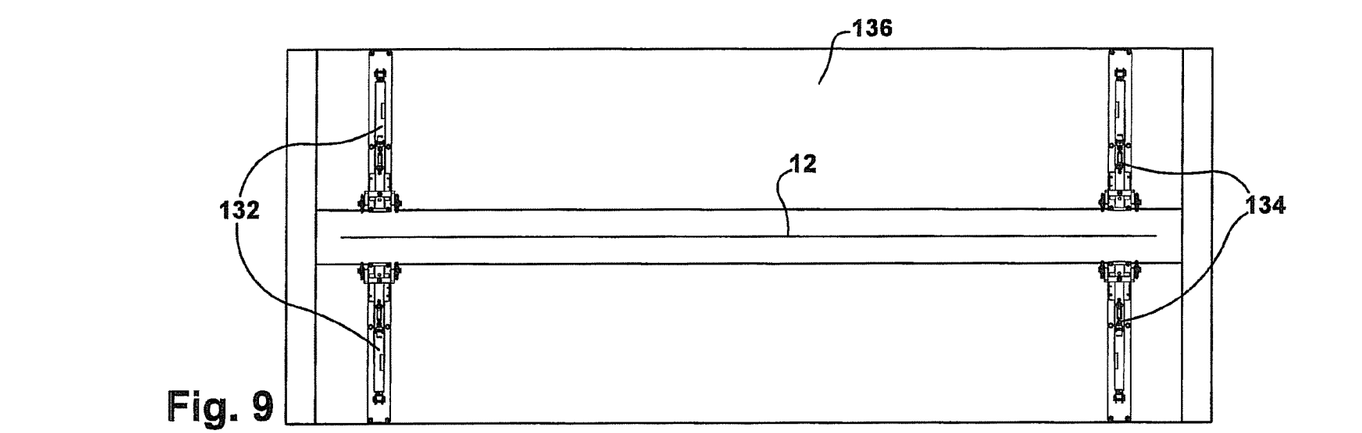
FIGS. 9 and 10 are top plan views showing the linear sheet restrainer device in a retracted position and engaged position away from and on the glass sheet.
Figure 10:
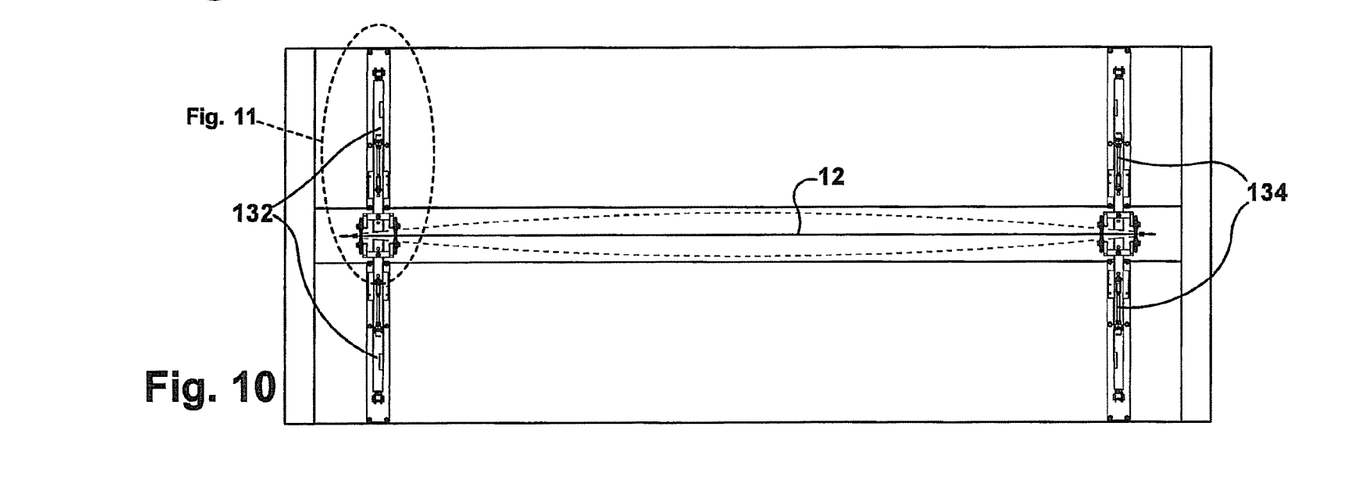
Figure 11:
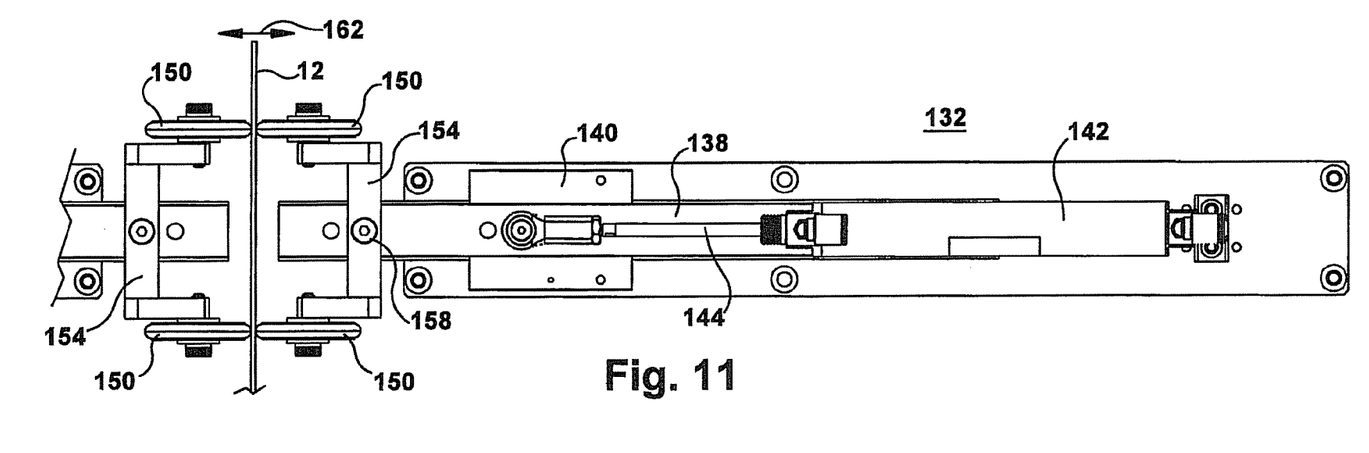
FIGS. 11 and 12 are top plan views of the linear sheet restrainer device where the glass is perpendicular to the device and applying angular motion to the device, respectively.
Figure 12:
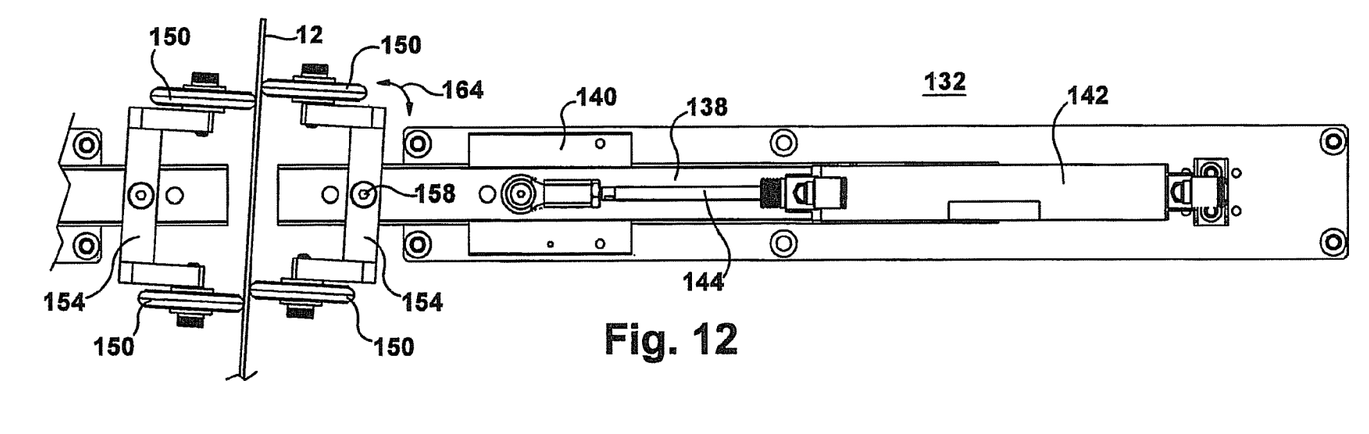

On the end of arm 138 is mounted a set of four rollers (one pair of rollers 150, and another pair of rollers 152) carried on H-shaped frame 154. These linear sheet restrainer units may have different numbers of rollers, for example, each unit may have two rollers on each side of the sheet. The rollers are mounted on axles 156 that rotate in bearings (not shown) carried by the H-frame. The H-frame is pivotally mounted to rail 138 using fastener 158 to form a pivot point.

Sheet restrainer unit 132 includes two subunits 157, 159 mounted to the frame on either other side of the glass sheet that move toward the sheet during clamping so as to be in alignment with each other. When piston rod 144 is extended out of the cylinder of both subunits the set of rollers 150, 152 of each subunit move from a retracted position (FIG. 9) to an engaged position (FIG. 10) in contact with the glass sheet on both sides of the glass and at both the first and second sides 63, 64 of the sheet, clamping the sheet between them. The rollers contact a non-quality region 160 of the glass. A position sensor (not shown) may be used to determine when the rollers have contacted the glass sheet.

Linear sheet restrainer 132 dampens lateral movement 162 of the glass sheet (FIG. 11) as such movement causes the pistons to move into and from the cylinders on each side of the glass. The H-shaped frame on which the rollers are mounted is permitted to pivot at points 158 in direction 164 (FIG. 12) to accommodate angular movement of the glass, but this angular movement is not dampened. Therefore, when the glass sheet moves, for example, toward the bottom left side of FIG. 8, piston rod 144 compresses the piston of lower subunit 157 in that figure while the piston rod of upper subunit 159 is extended and the piston of that cylinder is expanded. As both cylinders are maintained at a constant pressure via PLC 148 and pressure regulators 146, the pneumatic or hydraulic cylinders adjust automatically to movements of the glass. The range of movements of the pistons in the cylinders are preset to accommodate a range of movements of the glass sheet, typically on the order of at least 20 millimeters total or at least 10 millimeters for each device on a side of the glass. The pneumatic or hydraulic cylinder unit is a low friction cylinder, which functions not only to clamp the rollers to the glass but also offers linear damping while the rail moves back and forth in the carriage. The linear sheet restrainer units of the present embodiment constantly engage the glass sheet when mounted to a fixed frame. However, the linear sheet restrainer units may also be attached to TAM 24 where they either constantly engage the sheet even during return upward stroke of the TAM, or can retract during the upward stroke and then reengage the glass at the start of the next downward stroke.

In operation, in a seeking phase, PLC 148 instructs pressure regulator 146 to be set at a low pressure output. This controls the cylinder causing the piston rod to extend which extends arm 138. This extension continues at a low pressure for a predetermined period of time or until the rollers contact the glass at both sides. Arms 138 stop upon the rollers contacting the glass at the low pressure. A position sensor can also be used to determine when the rollers contact the glass and send electronic signals to the PLC which in turn instructs the cylinders to stop extending. Once the rollers have engaged both sides of the glass in a clamping position, the PLC instructs the pressure regulators to increase the clamping pressure. During the sheet restraining phase, the cylinders act as dampening devices, restraining lateral movements of the glass, while maintaining a clamping force on the glass.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A sheet restrainer for restraining movement of a continuously traveling glass sheet, comprising:
arms on opposite sides of the glass sheet;
a driving device coupled to said arms that moves said arms from a retracted position in which said arms are withdrawn from the glass sheet to an engaged position in which said arms are near said glass sheet and in alignment with each other;

rollers connected to said arms that are configured to rotate while simultaneously contacting the opposite sides of the glass sheet in said engaged position as the glass sheet continuously travels relative to the sheet restrainer in said engaged position; and a damping device configured to apply an adjustable damping force to at least one of said arms to dampen movement of said arm in said engaged position and thereby restraining movement of said sheet while the glass sheet continuously travels relative to the sheet restrainer.

2. The sheet restrainer of claim 1, wherein said damping device comprises a piston movable within a pneumatic or hydraulic cylinder.

3. The sheet restrainer of claim 1, wherein said damping device comprises magnets that provide eddy currents as said damping force.

4. The sheet restrainer of claim 1, further comprising a frame, said arms pivotally mounted to said frame, said driving device comprising a hydraulic or pneumatic cylinder connected to one of said arms and a piston rod connected to the other of said arms extending from a piston movable in said cylinder, wherein extension or retraction of said piston rod causes said arms to pivot between said retracted position and said engaged position.

5. The sheet restrainer of claim 4, wherein said arms each comprise a first arm portion that is pivotally mounted to said frame and a second arm portion that is pivotally mounted to said first arm portion, said rollers being carried on said second arm portion.

6. The sheet restrainer of claim 5, wherein said damping device comprises a first dashpot connected to said frame and said first arm portion of one of said arms, said first dashpot dampening movement of said arms due to lateral movement of the sheet, and a second dashpot connected to said first arm portion and said second arm portion of one of said arms, said second dashpot dampening pivotable movement of said second arm portion relative to said first arm portion due to angular movement of the sheet.

7. The sheet restrainer of claim 1, further comprising a frame, a carriage mounted to said frame in which each of said arms can slide in a linear direction, said driving device including a pneumatic or hydraulic cylinder mounted to said frame and connected to each of said arms causing said arms to move linearly between said retracted position and said engaged position in said carriage, wherein said cylinder also functions as said dampening device dampening linear movement of said arms due to lateral movement of the sheet.

8. The sheet restrainer of claim 4, wherein said frame is part of a traveling anvil machine that travels at a rate of the glass sheet or said frame is fixed relative to movement of the glass sheet.

9. The sheet restrainer of claim 7, wherein said frame is part of a traveling anvil machine that travels at a rate of the glass sheet or said frame is fixed relative to movement of the glass sheet.

10. A sheet restrainer for restraining movement of a continuously traveling glass sheet, comprising:

arms on opposite sides of the glass sheet;

a driving device coupled to said arms that moves said arms from a retracted position in which said arms are withdrawn from the glass sheet to an engaged position in which said arms are near said glass sheet and in alignment with each other;

rollers connected to said arms that are configured to rotate while simultaneously contacting the opposite sides of the glass sheet in said engaged position as the glass sheet continuously travels relative to the sheet restrainer in said engaged position; and a damping device configured to apply an adjustable damping force to at least one of said arms to dampen a linear movement of said arm in said engaged position and thereby restraining a lateral movement of said sheet while the glass sheet continuously travels relative to the sheet restrainer.

11. The sheet restrainer of claim 10, wherein said damping device comprises a first dashpot configured to dampen the linear movement of said arms due to the lateral movement of the sheet.

12. The sheet restrainer of claim 10, further comprising a frame, a carriage mounted to said frame in which each of said arms can slide in a linear direction.

13. The sheet restrainer of claim 12, wherein the driving device includes a pneumatic or hydraulic cylinder mounted to said frame and configured to move the arms between the retracted position and the engaged position.

14. The sheet restrainer of claim 13, wherein the cylinder is further configured as part of the damping device to dampen the linear movement of the arm in the engaged position.

15. A sheet restrainer for restraining movement of a continuously traveling glass sheet, comprising:

opposed arms on opposite sides of the glass sheet, wherein each opposed arm comprises a first arm portion and a second arm portion pivotally mounted to the first arm portion;

a driving device coupled to said opposed arms that moves said opposed arms from a retracted position in which said opposed arms are withdrawn from the glass sheet to an engaged position in which said opposed arms are near said glass sheet and in alignment with each other;

a plurality of rollers, wherein each roller is carried by a corresponding second arm portion of each of the opposed arms, wherein the rollers are each configured to rotate while simultaneously contacting a corresponding one of the opposite sides of the glass sheet in said engaged position as the glass sheet continuously travels relative to the sheet restrainer in said engaged position; and a damping device configured to apply an adjustable damping force to at least one of said arms to dampen a pivotable movement of said arm in said engaged position and thereby restraining an angular movement of said sheet while the glass sheet continuously travels relative to the sheet restrainer.

16. The sheet restrainer of claim 15, wherein said damping device comprises a dashpot connected to said first arm portion and said second arm portion of one of said opposed arms, said dashpot configured to dampen the pivotable movement of said second arm portion relative to said first arm portion due to angular movement of the sheet.

* * * * *